United States Patent
Dellock et al.

(10) Patent No.: US 10,336,878 B2
(45) Date of Patent: Jul. 2, 2019

(54) MICROCELLULAR FOAM EXTENSION DASH PANEL

(71) Applicant: FORD MOTOR COMPANY, Dearborn, MI (US)

(72) Inventors: Paul Kenneth Dellock, Northville, MI (US); Stuart C. Salter, White Lake, MI (US); Paulina Vazquez Orpinel, Mexico City (MX); Michael A. Musleh, Canton, MI (US); Ana Valeria Vazquez, Mexico City (MX)

(73) Assignee: FORD MOTOR COMPANY, Dearborn, MI (US)

( * ) Notice: Subject to any disclaimer, the term of this patent is extended or adjusted under 35 U.S.C. 154(b) by 263 days.

(21) Appl. No.: 15/600,197

(22) Filed: May 19, 2017

(65) Prior Publication Data
US 2018/0334546 A1    Nov. 22, 2018

(51) Int. Cl.
| | |
|---|---|
| C08J 9/04 | (2006.01) |
| C08J 9/06 | (2006.01) |
| C08J 9/08 | (2006.01) |
| C08J 9/10 | (2006.01) |
| C08J 9/00 | (2006.01) |
| C08K 3/02 | (2006.01) |
| C08L 23/14 | (2006.01) |

(52) U.S. Cl.
CPC ........... *C08J 9/0061* (2013.01); *C08J 9/0066* (2013.01); *C08J 9/0085* (2013.01); *C08J 9/0095* (2013.01); *C08K 3/02* (2013.01); *C08L 23/14* (2013.01); *C08J 2300/30* (2013.01); *C08J 2323/14* (2013.01); *C08J 2367/02* (2013.01); *C08J 2451/06* (2013.01); *C08K 2003/023* (2013.01); *C08K 2003/026* (2013.01)

(58) Field of Classification Search
CPC .. C08K 3/02; C08K 2003/026; C08J 2367/03; C08J 9/0085; C08J 9/0061; C03C 13/06
See application file for complete search history.

(56) References Cited

U.S. PATENT DOCUMENTS

| | | | |
|---|---|---|---|
| 7,017,250 B2 | 3/2006 | Gebreselassie et al. | |
| 8,337,975 B2 | 12/2012 | Mally | |
| 2009/0292035 A1* | 11/2009 | Semmes | C08J 9/0061 521/141 |
| 2011/0237145 A1* | 9/2011 | Steinke | B29C 44/1209 442/152 |
| 2014/0050886 A1 | 2/2014 | Burgin et al. | |

FOREIGN PATENT DOCUMENTS

| | | |
|---|---|---|
| CN | 102731903 A * | 10/2012 |
| WO | 2010017254 | 2/2010 |

OTHER PUBLICATIONS

MICAMAFCO, "Mica Composite", www.micaworld.in/micacomposite.html, 2 pgs, retrieved Dec. 16, 2016.

* cited by examiner

*Primary Examiner* — Kara B Boyle
(74) *Attorney, Agent, or Firm* — Raymond L. Coppiellie; Brooks Kushman P.C.

(57) ABSTRACT

A composition for the manufacture of temperature resistant and sound attenuating automotive parts includes polyethylene terephthalate resin, basalt fibers, and mica. The basalt fibers and mica may be between 35 and 40% of the composition by weight of the total composition. The basalt fibers may be between 20 and 30% of the composition by weight and the mica may be between 5 and 15% of the composition by weight. The basalt fibers may be 25% of the composition by weight and the mica may be 10% of the composition by weight. A method is disclosed for molding a temperature resistant and sound attenuating part by blending a foaming agent with a thermoplastic olefin, basalt fibers and mica to form a resin mixture. The resin mixture is injected under pressure into a die to fill the die. The pressure is reduced to allow the foaming agent to form a microcellular core.

12 Claims, 3 Drawing Sheets

MICROCELLULAR FOAM EXTENSION DASH PANEL

TECHNICAL FIELD

This disclosure relates to a composition and a method of manufacturing a part that has a high heat deflection temperature and sound attenuation properties.

BACKGROUND

Vehicles are being developed that have reduced weight and improved fuel economy. Turbochargers are being incorporated into engine designs to compensate for reductions in engine displacement as part of the effort to improve fuel economy. Lower displacement engines provided with turbochargers run at higher revolutions per minute (RPMs) and generate more noise than engines having similar torque output. The exhaust side of turbochargers generate high heat particularly after the engine is turned off and air circulation is minimized.

Cowl structures are used to attenuate noise from the engine. Cowl structures include extension dash panels (EDPs) that are removable to facilitate engine servicing. Prior art EDPs may be manufactured from stamped steel or aluminum or may be made of sheet molding compounds (SMCs). EDPs made of stamped metal or SMC add weight and increase the cost of the parts and cost of labor for installation. Layers of sound absorbing insulation may be needed to reduce the transmission of engine noise into the passenger compartment of the vehicle. The layers of sound absorbing material are attached with fasteners that also add weight and increase part cost and assembly labor.

EDPs are subjected to high heat in the engine compartment and may be installed near the turbocharger exhaust area. EDPs made of common thermoplastic material may melt or be distorted when exposed to the high temperatures in the engine compartment of a vehicle near a turbocharger. Heat shields may be required to protect the EDP from the heat generated by the turbocharger exhaust. The heat shields may include foam layers between the EDP and the heat shields to absorb and deflect heat.

This disclosure is directed to solving the above problems and other problems as summarized below.

SUMMARY

According to one aspect of this disclosure, a composition is disclosed that consists essentially of polyethylene terephthalate resin, basalt fibers, and mica.

The basalt fibers and mica contained in the composition may be between 35 and 40% of the composition by weight. The basalt fibers may be between 20 and 30% of the composition by weight and the mica may be between 5 and 15% of the composition by weight. More specifically, the basalt fibers may be 25% of the composition by weight and the mica may be 10% of the composition by weight. The mica may have an aspect ratio of more than 80:1.

The polyethylene terephthalate resin may be recycled polyethylene terephthalate resin combined in any proportion with virgin polyethylene terephthalate resin. Alternatively, the polyethylene terephthalate resin may be 50% virgin polyethylene terephthalate resin and 50% recycled polyethylene terephthalate resin.

The polyethylene terephthalate is compatibilized with the basalt fibers and mica by adding maleic anhydride grafted polypropylene coupling agent. The coupling agent increases the bond of the mica and basalt fibers to the base resin improving impact properties and stiffness. Between 1 and 4% by weight maleic anhydride grafted polypropylene coupling agent is used.

The composition may further comprise a flow enhancer including phosphonium tetraborate salt or trihexyl(tetradecyl)phosphonium.

According to another aspect of this disclosure, a method is disclosed for molding a temperature resistant and sound attenuating part. The method begins by blending a foaming agent with a thermoplastic olefin, basalt fibers and mica to form a resin mixture. The resin mixture is then injected into an injection mold at a pressure between 70 Megapascal (MPa) and 125 MPa. The pressure in the mold is held until the mold is fully filled. The pressure in the mold is then reduced to a pressure of 7 MPa or less to allow the foam to expand and completely fill the mold.

According to additional aspects relating to a method of making a heat resistant and noise dampening panel, during the step of injecting the resin mixture into the mold the basalt fibers and mica are oriented by the flow of the resin mixture parallel to the direction of flow of the resin mixture. The basalt fibers and mica are solidified in an outer wall during the step of holding the pressure in the mold until the mold is fully filled. A gas contained in the foaming agent expands to fill the space between the outer walls to form an interior foamed cellular structure during the step of reducing the pressure in the mold.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

This disclosure provides compositions for the manufacture of temperature resistant and sound attenuating automotive parts. The composition comprises, preferably consists essentially of and more preferably consists of polyethylene terephthalate resin, basalt fibers, and mica.

Figure 1:
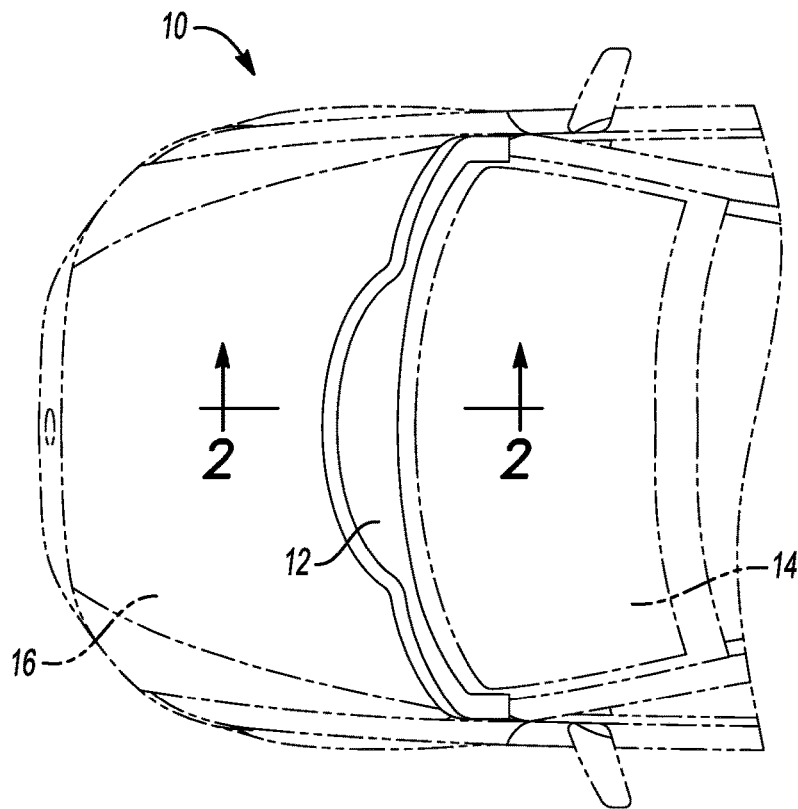
FIG. 1 is a fragmentary top plan view of a vehicle in phantom lines with an extension dash panel shown in solid lines.

Referring to FIG. 1, a vehicle 10 is partially illustrated in phantom to show an extension dash panel 12 installed in the vehicle 10. The extension dash panel 12 is assembled in the vehicle 10 to be removable for vehicle service and extends from the dash panel 14 forward and into the rear portion of the engine compartment 16.

Figure 2:
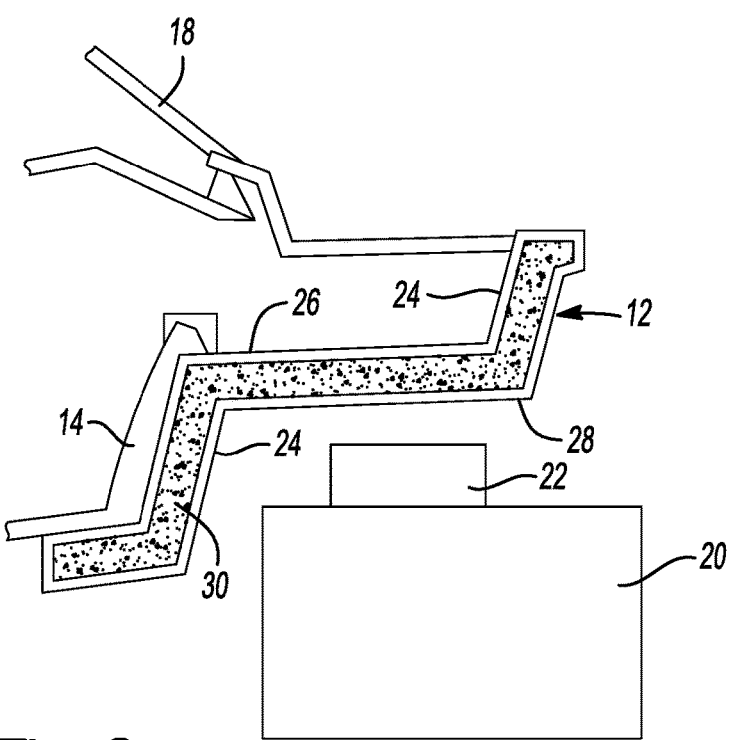
FIG. 2 is a cross-section view taken along the line 2-2 in FIG. 1.

Referring to FIG. 2, the extension dash panel 12 is shown in cross section attached to the dash panel 14 and below the windshield 18 of the vehicle 10. An engine 20 and turbocharger 22 are diagrammatically illustrated below the extension dash panel 12. The extension dash panel 12 includes a skin layer 24 on a top side 26 and a bottom side 28. A microcellular foam core 30 is disposed between the top and bottom sides 26, 28 of the extension dash panel 12. References to the top and bottom sides are to the relative positions in FIG. 2, but the part may be oriented in other positions and that there are vertically extending portions of the extension dash panel 12.

Figure 3:
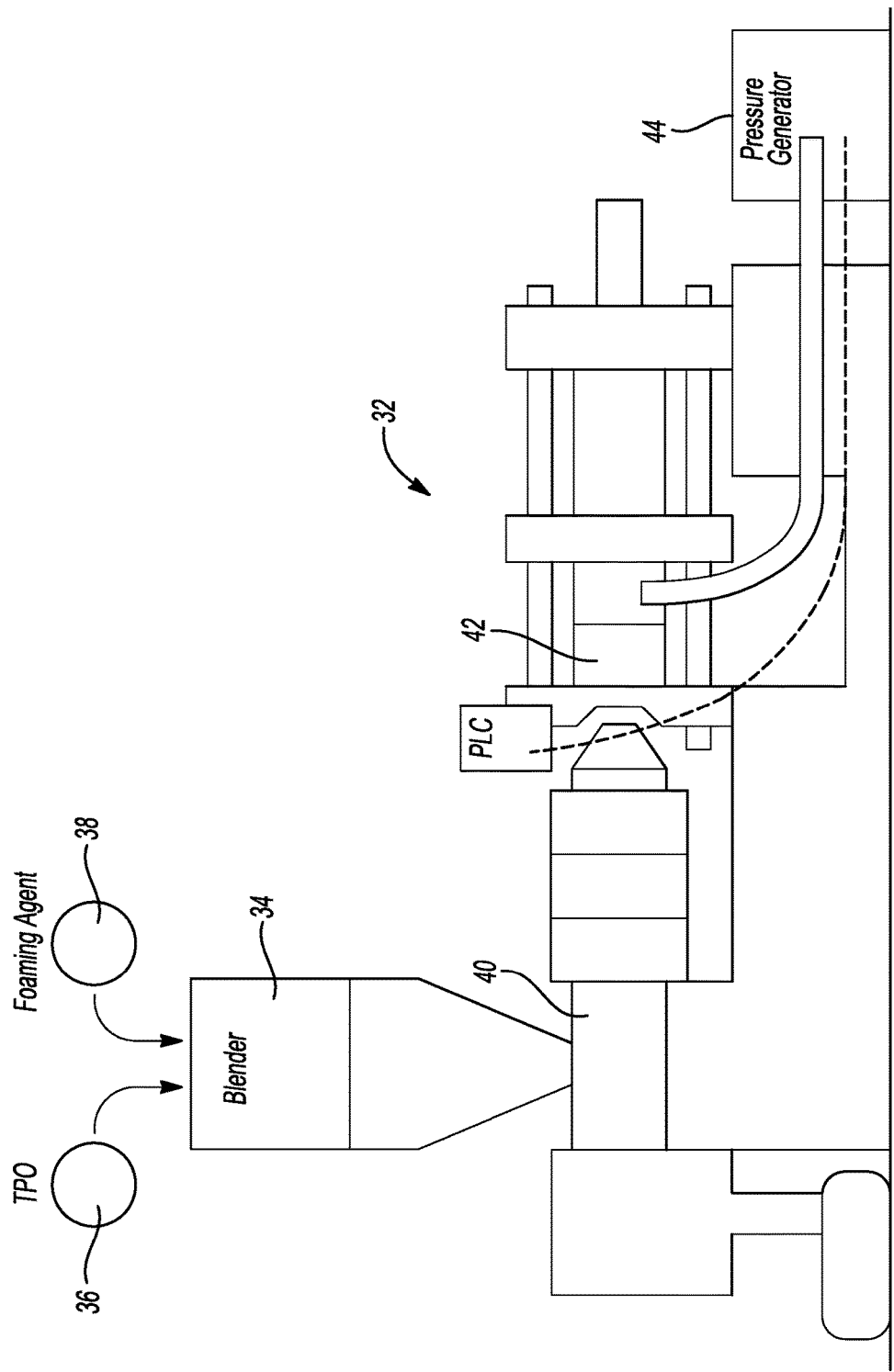
FIG. 3 is a diagrammatic front elevation view of an injection molding machine made according to one aspect of this disclosure.

Referring to FIG. 3, an example of an injection molding machine 32 is illustrated. The injection molding machine 32 includes a blender 34 that receives thermoplastic olefin pellets 36 and a foaming agent 38. Instead of thermoplastic olefin pellets, acrylic-styrene-acrylonitrile (ASA) polymer pellets may be used in the process. The pellets 36 and foaming agent 38 are blended together in the blender 34 (with other constituents such as basalt fibers, mice, phosphonium tetraborate salt or trihexyl(tetradecyl)phosphonium, and maleic anhydride grafted polypropylene) and supplied to a plasticizing barrel 40 where the mixture is heated to a molten state. The heated mixture is injected into an injection molding die 42 at a high molding pressure of between 70 MPa (1,000 psi) and 125 MPa (18,000 psi) during the mold filling step until the mold is filled. The disclosed high pressure structural foam molding process utilizes a molten resin that has a foaming agent that contains nitrogen or carbon dioxide gas or a chemical blowing agent. Solid skins are formed against the walls of the mold, while the core of the part remains structurally foamed. The class "A" surfaces of the part are solidified to form the outer surface wall, or skin layer 24.

The disclosed high pressure structural foam molding process utilizes a molten resin that has a foaming agent that contains nitrogen or carbon dioxide gas or a chemical blowing agent. Once the mold is completely filled, the pressure in the mold is reduced to 7 MPa (1,000 psi) or less to allow the foaming gas or the foaming agent to expand in the core 30 to fill the walls and re-pack the part from inside and eliminate sink marks in the skin layer 24 eliminating Class "A" surface defects. Back pressure is provided by a pressure generator 44 that provides up to 7 MPa (1,000 psi) of pressure to the injection molding die while the foam is formed in the die. The part weight may be reduced by up to 8-20% because the outer skin is solid and the center of the wall is foam.

Figure 4:
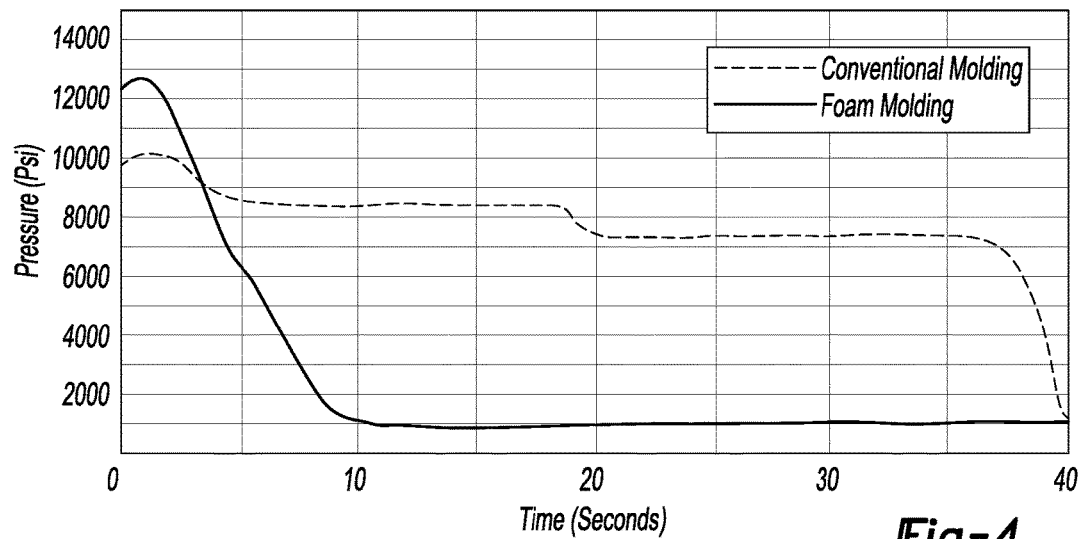
FIG. 4 is a graph of the pressure in the mold over time comparing the disclosed foam molding process compared to a conventional molding process.

Referring to FIG. 4, a pressure over time graph compares the foam molding process as disclosed herein to a conventional molding process. In the illustrated example of the conventional molding process begins at a pressure of approximately 70 MPa (10,000 psi) that is reduced over a period of about 5 seconds to approximately 60 MPa (80 psi) and is held until about the 20 second point at which time the pressure reduced to approximately 52 MPa (7,000 psi) and is held in a pack and process step until about the 37 second point in the process.

With continued reference to FIG. 4 the molding process disclosed herein is described. The process begins by injecting the mixture at a pressure of approximately 83 MPa. (12,000 psi) The pressure is reduced over a period of about 10 seconds to approximately 7 MPa (1,000 psi) and is held at approximately 7 MPa (1,000 psi) for about 40 seconds until the foam is formed in the die.

Figure 5:
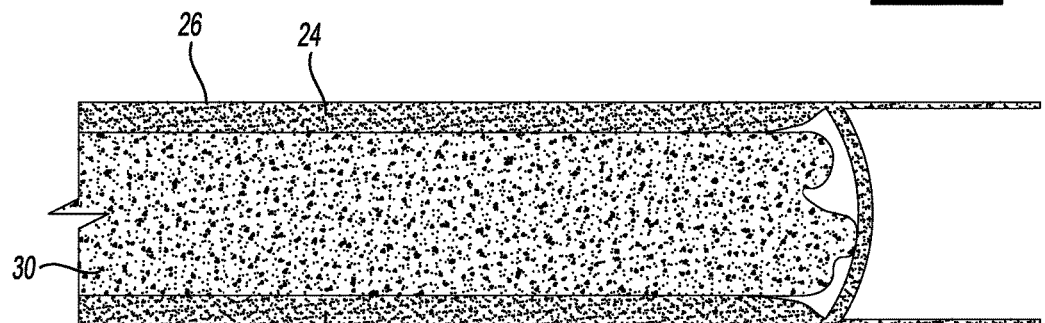
FIG. 5 is a fragmentary cross section view of a part including a thermoplastic olefin skin and a foamed thermoplastic olefin core as it is formed with controlled back pressure.

Referring to FIG. 5, the step of allowing the foaming agent to expand is illustrated. The heated mixture expands after filling the die 42 (shown in FIG. 3) and after the skin layers 24 are formed, the foamed mixture is formed with a limited amount of back pressure being provided as the core 30 is formed. The finished dash panel extension 12 includes the thin outer wall, or skin 24, on the top 26 and bottom 28 surfaces that are separated by the foam core 30.

Figure 6:
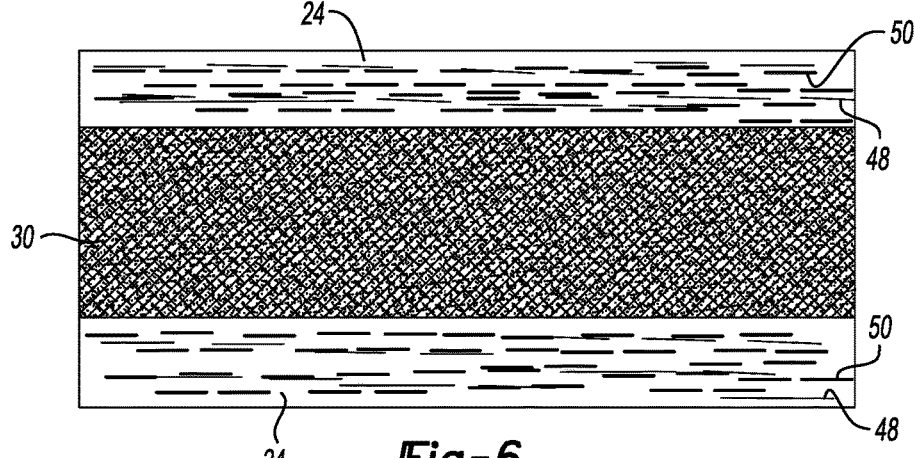
FIG. 6 is a diagrammatic cross section view of a part made according to one aspect of this disclosure showing basalt fibers and mica in the thermoplastic olefin skin aligned in the direction of flow of the material as the material is injected into the injection molding die.

Referring to FIG. 6, a cross section of a finished part is shown to include the foam core 30 that is bounded by the skin layers 24. The skin layers 24 include basalt fibers 48 and mica 50 that are retained in the skin and oriented in the direction of material flow during the step of injecting the mixture into the injection molding die 42 (shown in FIG. 3).

The PET resin may be provided as a blend of virgin and recycled PET in a ratio of 0:100, 10:90, 25:75, 50:50, 75:25, 90:10, or 100:0 and may be filled with basalt fibers and mica. The basalt fibers enhance the heat deflection characteristic of the finished product as shown in the previous example. The mica filler enhances the ability of the finished part to absorb, or attenuate, sound. Mica having an aspect ratio of 55:1 such as 200 mesh phlogopite mica with a mean particle size of 45 μm, an aspect ratio of 80:1 such as 325 mesh phlogopite mica with a mean particle size of 8 μm, or an aspect ratio of 90:1 such as 150 mesh phlogopite mica having a mean particle size of 34 μm may be specified for improved sound attenuation. The aspect ratio is the ratio of the diameter of the platelet to the thickness of the platelet.

The basalt fibers may comprise 25% of the composition by weight and the mica may comprise 10% of the composition by weight. Alternatively, the basalt fibers may comprise between 10 and 25% of the composition and the mica may comprise between 5 and 15% of the composition by total weight.

A coupling agent such as maleic anhydride grafted polypropylene may be added to increase the bond strength of the mica and basalt fibers to the base resin for improving impact properties and stiffness. One example of a coupling agent is maleic anhydride grafted polypropylene. Other suitable coupling agents may include a soft E-nBA-GMA like Elvaloy® PTW from Dupont, an acrylate copolymer like DuPont™ Elvaloy® AC or a variety of organosilanes including vinyl silane, Aminosilane or Methacryl Silanes The coupling agent may comprise 0.5 to 3% by weight, 1 to 2% by weight or 1.5% by weight.

A flow enhancer may be incorporated in the mixture such as phosphonium tetraborate salt or trihexyl(tetradecyl)phosphonium. Other types of flow enhancers may include the use of Glycol Ethers and Ester Solvents. The flow enhancer may comprise 0.5 to 3% by weight, 1 to 2% by weight or 1.5% by weight.

A foaming agent may be used that contains a nitrogen or carbon dioxide gas or blowing agents such as isocyanates, hydrazine, Calcium Carbonate CaCO3 or as an alternative directly introducing a super critical nitrogen or carbon dioxide fluid by using Mucell™ or similar process. The blowing agent may comprise between 0.5 to 2% by weight, between 0.75 to 1.5% by weight or 1% by weight.

Example 1

In a first example, polyethylene terephthalate (PET) resin is filled with between 35 and 40% filler material. The resin may be 50% virgin PET and 50% recycled PET and has a melting point of 250° C. The deflection temperature of unfilled PET at 0.46 MPa is 70° C. and at 1.8 MPa is 65° C. at 1.8 MPa. PET when filled with 20% basalt fibers can obtain a heat deflection temperature of 250° C. AT 1.8 MPa. If recycled PET is included, the resin mixture may further comprise a flow enhancer.

Example 2

In a second example, the mixture by weight includes the following components, the weight of each component is based on the total weight of the mixture:
61% copolymer of polypropylene;
25% basalt;
10% mica
1.5% maleic anhydride grafted polypropylene (coupling agent)
1.2% color masterbatch (colorant); and
1% foaming agent.

When tested using ISO Test Method 527 the elongation at yield was 2.5% and the tensile modulus was 9.2 GPa. ISO test Method 178 resulted in a flex modulus of 7.5 GPa. ISO Test Method 180 resulted in an Izod impact result of 9.0 Kj/cm. IOS Test Method 1183 resulted in a density of 1.55 gm/cc. ISO test method 75 resulted in a heat deflection at 260 psi of 220°.

Example 3

In a third (prophetic) example, the mixture by weight includes the following components, the weight of each component is based on the total weight of the mixture:
81% copolymer of polypropylene;
10% basalt;
5% mica
1.5% maleic anhydride grafted polypropylene
1.2% colorant; and
1% foaming agent.

When extrapolated in a simulation, ISO Test Method 527 the elongation at yield was 3.1% and the tensile modulus was 3.9 GPa. ISO test Method 178 resulted in a flex modulus of 3.7 GPa. ISO Test Method 180 resulted in an Izod impact result of 11.0 Kj/cm. IOS Test Method 1183 resulted in a density of 1.36 gm/cc. ISO test method 75 resulted in a heat deflection at 260 psi of 190°.

Example 4

In a fourth (prophetic) example, the mixture by weight includes the following components, the weight of each component is based on the total weight of the mixture:
76% copolymer of polypropylene;
10% basalt;
10% mica
1.5% maleic anhydride grafted polypropylene
1.2% colorant; and
1% foaming agent.

When extrapolated in a simulation, ISO Test Method 527 the elongation at yield was 2.6% and the tensile modulus was 4.1 GPa. ISO test Method 178 resulted in a flex modulus of 3.8 GPa. ISO Test Method 180 resulted in an Izod impact result of 9.0 Kj/cm. IOS Test Method 1183 resulted in a density of 1.4 gm/cc. ISO test method 75 resulted in a heat deflection at 260 psi of 200°.

Example 5

In a fifth example, acrylic-styrene-acrylonitrile (ASA) resin is provided with 35% filler including 25% chopped basalt fibers by weight and 10% mica by weight having an aspect ratio of 80:1 of the diameter of the platelet to the thickness of the platelet. ASA is believed to be amenable to being combined with the same constituents as listed above in the same proportions by weight.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and includes modifications of the illustrated embodiments.

What is claimed is:

1. A method of molding a temperature resistant and sound attenuating part comprising:
   blending a foaming agent with a thermoplastic, basalt fibers and mica to form a resin mixture;
   injecting the resin mixture into an injection mold at a pressure between 10,000 and 125 MPa;
   holding the pressure in the mold until the mold is fully filled; and
   reducing the pressure in the mold to a pressure of 7 MPa or less.

2. The method of claim 1 wherein the basalt fibers and mica are between 35 and 40% of the resin mixture by weight.

3. The method of claim 1 wherein the basalt fibers are between 10 and 25% of the resin mixture by weight and the mica is between 5 and 10% of the resin mixture by weight.

4. The method of claim 3 wherein the basalt fibers are 25% of the resin mixture by weight and the mica is 10% of the resin mixture by weight.

5. The method of claim 4 wherein the mica has an aspect ratio of more than 80:1.

6. The method of claim 1 wherein the thermoplastic is a mixture of virgin polyethylene terephthalate resin and recycled polyethylene terephthalate resin.

7. The method of claim 6 wherein the polyethylene terephthalate resin is 50% virgin polyethylene terephthalate resin and 50% recycled polyethylene terephthalate resin.

8. The method of claim 7 wherein the resin mixture further includes a flow enhancer selected from the group consisting of:
   phosphonium tetraborate salt; and
   trihexyl(tetradecyl)phosphonium.

9. The method of claim 1 wherein during the step of injecting the resin mixture into the mold the basalt fibers and mica are oriented parallel to a direction of flow of the resin mixture.

10. The method of claim 9 wherein during the step of holding the pressure in the mold until the mold is fully filled, the basalt fibers and mica are solidified in an outer wall.

11. The method of claim 10 wherein during the step of reducing the pressure in the injection mold, a gas contained in the foaming agent expands to fill a space between the outer walls to form an interior foamed cellular structure.

12. The method of claim 1 further comprising:
compatibilizing the basalt fibers and mica by adding maleic anhydride grafted polypropylene to the resin mixture.

* * * * *